(12) United States Patent
Yakishyn et al.

(10) Patent No.: US 10,970,546 B2
(45) Date of Patent: Apr. 6, 2021

(54) METHOD AND APPARATUS FOR PROVIDING INFORMATION REGARDING VIRTUAL REALITY IMAGE

(71) Applicant: Samsung Electronics Co., Ltd., Suwon-si (KR)

(72) Inventors: Yevgen Yakishyn, Kiyv (UA); Oleksandr Shchur, Kiyv (UA); Oleksandr Radomskyi, Kharkov (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/851,275

(22) Filed: Dec. 21, 2017

(65) Prior Publication Data

US 2018/0181811 A1 Jun. 28, 2018

(30) Foreign Application Priority Data

Dec. 23, 2016 (KR) ........................ 10-2016-0178011

(51) Int. Cl.
| | |
|---|---|
| *G06K 9/00* | (2006.01) |
| *G06T 19/00* | (2011.01) |
| *G06K 9/32* | (2006.01) |
| *G06T 11/60* | (2006.01) |
| *G02B 27/01* | (2006.01) |
| *G06F 3/01* | (2006.01) |
| *G02B 27/00* | (2006.01) |
| *G06F 3/0482* | (2013.01) |
| *G06F 3/0484* | (2013.01) |

(52) U.S. Cl.
CPC ..... *G06K 9/00671* (2013.01); *G02B 27/0093* (2013.01); *G02B 27/017* (2013.01); *G06F 3/013* (2013.01); *G06F 3/0482* (2013.01); *G06F 3/04842* (2013.01); *G06K 9/00597* (2013.01); *G06K 9/3233* (2013.01); *G06K 9/3241* (2013.01); *G06T 11/60* (2013.01); *G06T 19/003* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 10,229,541 B2 * | 3/2019 | Perry | H04N 13/344 |
| 2010/0007601 A1 | 1/2010 | Lashina et al. | |
| 2010/0231687 A1 | 9/2010 | Amory et al. | |

(Continued)

FOREIGN PATENT DOCUMENTS

| | | |
|---|---|---|
| JP | 5800602 B2 | 10/2015 |
| KR | 10-1617649 B1 | 5/2016 |

OTHER PUBLICATIONS

Girgensohn et al., "Support for effective use of multiple video streams in security", VSSN '06 (Year: 2006).*

(Continued)

*Primary Examiner* — Soo Jin Park

(57) ABSTRACT

A method a device and a computer readable medium for providing information regarding a virtual reality (VR) image are disclosed. The method includes providing the VR image. The method also includes determining, based on a gaze of a user viewing the VR image, an image that is reproduced in a partial area of the VR image as an image of interest. The method further includes providing information regarding the image of interest.

16 Claims, 15 Drawing Sheets

(56) References Cited

U.S. PATENT DOCUMENTS

| | | | |
|---|---|---|---|
| 2014/0002352 A1 | 1/2014 | Jacob et al. | |
| 2014/0098135 A1 | 4/2014 | Fein et al. | |
| 2015/0161807 A1 | 6/2015 | Pack | |
| 2017/0041597 A1* | 2/2017 | Sugaya | G02B 27/00 |
| 2017/0221264 A1* | 8/2017 | Perry | H04N 13/344 |
| 2017/0347039 A1* | 11/2017 | Baumert | H04N 5/265 |
| 2017/0358141 A1* | 12/2017 | Stafford | G02B 27/017 |
| 2018/0004289 A1* | 1/2018 | Wilson | G06K 9/00 |
| 2018/0007258 A1* | 1/2018 | Seko | H04N 5/23203 |
| 2018/0176547 A1* | 6/2018 | Kobayashi | G06F 3/012 |

OTHER PUBLICATIONS

Belardinelli, Anna, et al., "Gaze motion clustering in scan-path estimation," Cogn Process (2008) 9:269-282, DOI 10.1007/s10339-008-0206-2, Accepted Feb. 8, 2008, Published online Mar. 20, 2008, Springer-Verlag 2008, 14 pages. Retrieved from: https://www.uni-bielefeld.de/psychologie/ae/Ae01/People/Anna%20Belardinelli/CogProc2008.pdf (Mar. 20, 2008).

Doshi, Anup, et al., "Investigating the Relationships Between Gaze Patterns, Dynamic Vehicle Surround Analysis, and Driver Intentions," IEEE, 2009, 6 pages. Retrieved from: http://cvrr.ucsd.edu/publications/2009/doshi_IV09.pdf(2009).

Ejaz, Naveed, et al., "Adaptive key frame extraction for video summarization using an aggregation mechanism," J. Vis. Commun. Image R. 23 (2012), 1031-1040, Elsevier, 1040 pages.

Ginzburg, Boris, "Introduction: Convolutional Neural Networks for Visual Recognition," ICRI-CI, Intel Collaborative Research Institute Computational Intelligence, 2013, 46 pages. Retrieved from: http://courses.cs.tau.ac.il/Caffe_workshop/Bootcamp/pdf_lectures/Lecture%201%20CNN%20introduction.pdf(2013).

Khurana, Khushboo, et al., "Techniques for Object Recognition in Images and Multi-Object Detection," International Journal of Advanced Research in Computer Engineering & Technology (IJARCET), vol. 2, Issue 4, Apr. 2013, ISSN:2278-1323, 6 pages.

Kim, Gunhee, et al., "Jointly Summarizing Large Collections of Web Images and Videos for Storyline Reconstruction," 2015, 9 pages.

Little, Max A., et al., "Generalized methods and solvers for noise removal from piecewise constant signals," Proceedings of the Royal Society A, (2011), 467, 3088-3114, doi:10.1098/rspa.2010.0671, Published online Jun. 8, 2011, 27 pages. Retrieved from: http://rspa.royalsocietypublishing.org/content/royprsa/467/2135/3088.full.pdf(Jun. 8, 2011).

Olshannikova, Ekaterina, et al., "Visualizing Big Data with augmented and virtual reality: challenges and research agenda," SpringerOpen, Journal of Big Data, Oct. 1, 2015, 29 pages. Retrieved from: http://journalofbigdata.springeropen.com/articles/10.1186/s40537-015-0031-2(Oct. 1, 2015).

Pillalamarri, Ramakrishna S., et al., "Cluster: A program for the identification of eye-fixation-cluster characteristics," Behavior Research Methods (/journal/113441/behavior-research-methods), Mar. 1993, 2 pages. Retrieved from: http://paperity.org/p/19130849/cluster-a-program-for-the-identification-of-eye-fixation-cluster-characteristics(Mar. 1993).

Potapov, Danila, et al., "Category-specific video summarization," HAL archives-ouvertes.fr, ECCV—European Conference on Computer Vision, Sep. 2014, Zurich, Switzerland, Springer, 8694 (Part VI), pp. 540-555, 2014, Lecture Notes in Computer Science, 17 pages. Retrieved from: https://hal.inria.fr/hal-01022967/PDF/video_summarization.pdf(Jul. 11, 2014).

Santella, Anthony, et al., "Robust Clustering of Eye Movement Recordings for Quantification of Visual Interest," In Eye Tracking Research and Applications (ETRA) Symposium 2004, 8 pages.

Shao, Mang, et al., "A comparative study of video-based object recognition from an egocentric viewpoint," ScienceDirect, Neurocomputing (2015), Revised Jul. 2, 2015, Accepted Jul. 13, 2015, Elsevier, http://dx.doi.org/10.1016/j.neucom.2015.07.023, 0925-2312, 9 pages.

Spakov, Oleg, et al., "Application of Clustering Algorithms in Eye Gaze Visualizations," Information Technology and Control, 2007, vol. 36, No. 2, ISSN 1392-124X, 4 pages.

Sugano, Yusuke, et al., "Graph-based Joint Clustering of Fixations and Visual Entities," ACM Transactions on Applied Perception, vol. 10, No. 2, Article 1, Publication date, May 2013, DOI:http://dx.doi.org/10.1145/0000000.0000000, 8 pages. Retrieved from: http://www-infobiz.ist.osaka-u.ac.jp/user/matsushita/papers/acmtap2013.pdf(May 2013).

Tafaj, Enkelejda, "Bayesian Online Clustering of Eye Movement Data," ETRA 2012, Santa Barbara, CA, Mar. 28-30, 2012, ACM 978-1-4503-1225-7/12/0003, 4 pages. Retrieved from: https://hpi.de/fileadmin/user_upload/fachgebiete/naumann/publications/p285-tafaj.pdf.

University of London, "Welcome to the Department of Psychological Sciences," Department of Psychological Sciences, Birbeck, University of London, Nov. 24, 2017, 5 pages. Retrieved from: http://www.bbk.ac.uk/psychology/our-staff/academic/tim-smith/documents/Clustering_of_Gaze_During_Dynamic_Scene_Viewing_is_Predicted.pdf(Apr. 21, 2016).

Wikipedia, "Autocorrelation," Retrieved from: https://en.wikipedia.org/w/index.php?title=Autocorrelation&oldid=811776105, last edited Nov. 23, 2017, 8 pages.

Wikipedia, "Potts model," Retrieved from: https://en.wikipedia.org/w/index.php?title=Potts_model&oldid=796676713, Aug. 22, 2017, 6 pages.

Wikipedia, "Scale-invariant feature transform," Retrieved from: https://en.wikipedia.org/w/index.php?title=Scale-invariant_feature_transform&oldid=810584739, Nov. 16, 2017, 15 pages.

Wikipedia, "Speeded up robust features," Retrieved from: https://en.wikipedia.org/w/index.php?title=Speeded_up_robust_features&oldid=796404867, Aug. 20, 2017, 4 pages.

Zivotofsky, Ari Z., et al., "Tracking of illusory target motion: Differences between gaze and head responses," ScienceDirect, Vision Research, vol. 35, Issue 21, Nov. 1995, pp. 3029-3035, Elsevier, 6 pages. Retrieved from: http://www.sciencedirect.com/science/article/pii/004269899500067A(Nov. 21, 1995).

\* cited by examiner

FIG. 3B
| MOVEMENT OF USER'S GAZE | CHANGE OF AREA WHERE DYNAMIC IMAGE OF INTEREST IS REPRODUCED | |
|---|---|---|
| 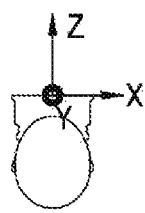 | 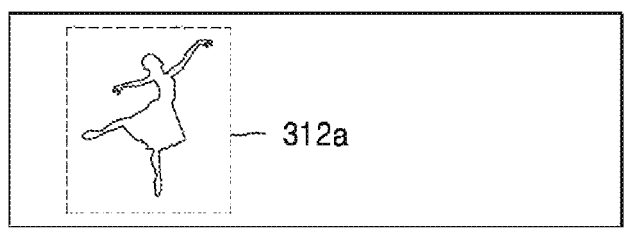 | FRAME 1 |
| 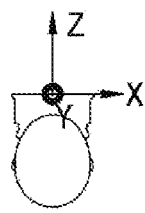 | 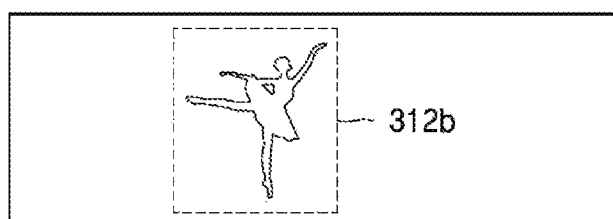 | FRAME 2 |
| 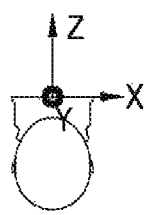 | 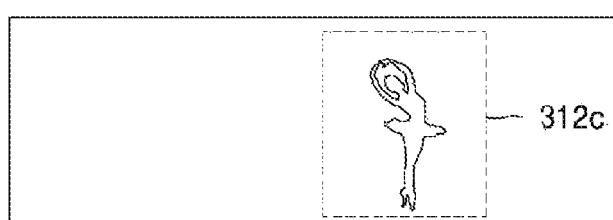 | FRAME 3 |
| 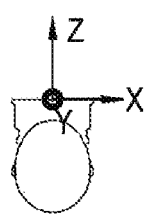 | 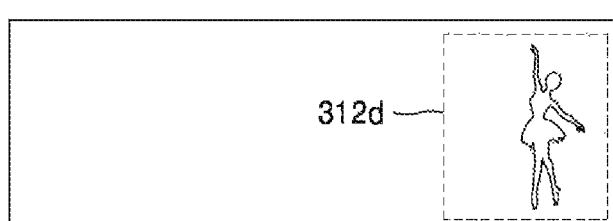 | FRAME 4 |

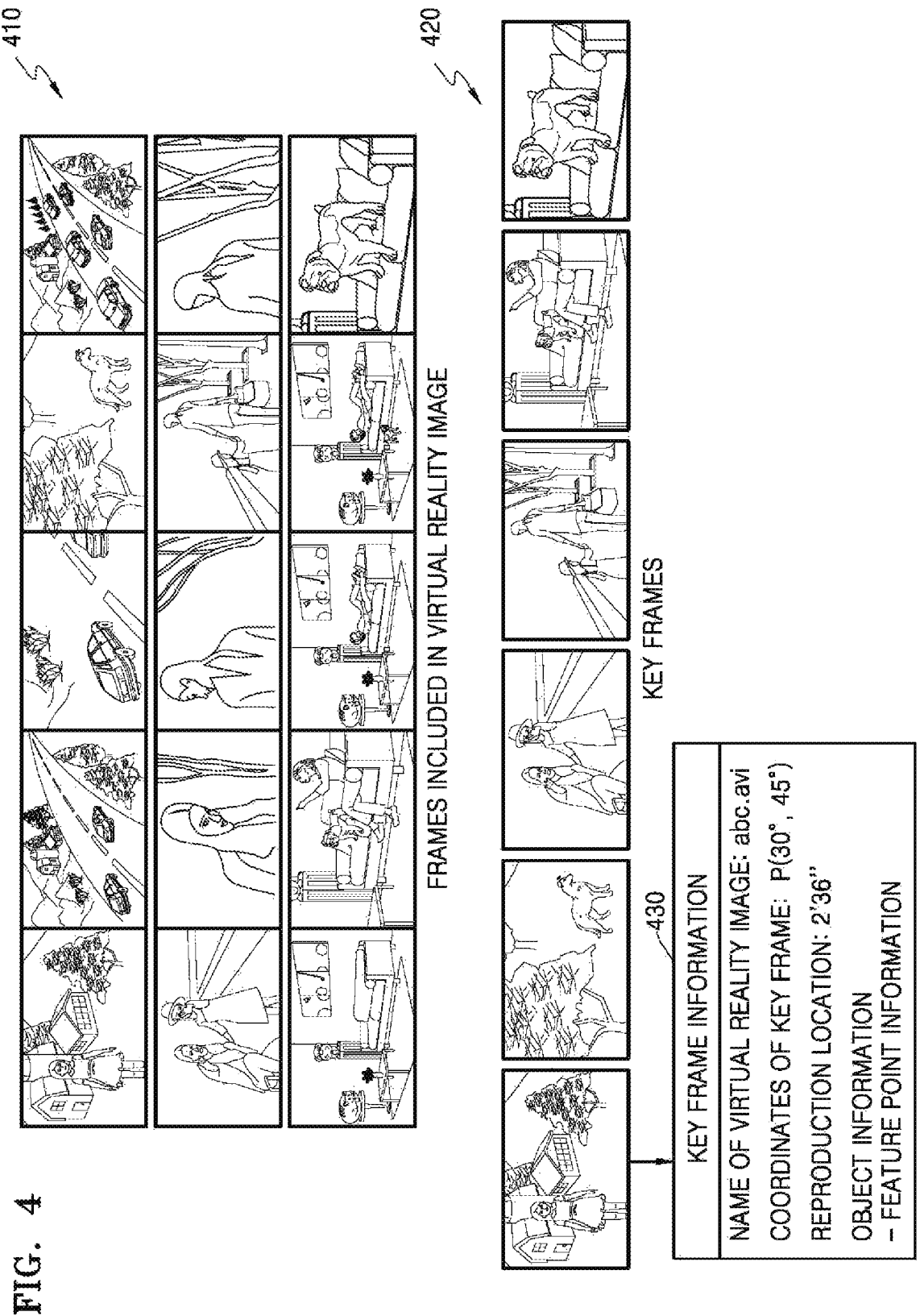

METHOD AND APPARATUS FOR PROVIDING INFORMATION REGARDING VIRTUAL REALITY IMAGE

CROSS-REFERENCE TO RELATED APPLICATION AND CLAIM OF PRIORITY

This application is related to and claims priority to Korean Patent Application No. 10-2016-0178011, filed on Dec. 23, 2016, the contents of which are incorporated herein by reference.

TECHNICAL HELD

The present disclosure relates to methods and apparatuses for providing information regarding a virtual reality image.

BACKGROUND

Recently, apparatuses for providing images to users by using virtual reality (VR) devices have been developed. VR technology allows users to feel a sense of reality via manipulated sense stimuli and may be utilized in many industrial fields such as games, education, medicine, and journalism. With the development of VR-related technology, users may view a 360-degree image by using various devices. Users viewing a 360-degree image may feel more immersed compared to when they view a planar image.

SUMMARY

To address the above-discussed deficiencies, it is a primary object to provide methods and apparatuses for providing information regarding a virtual reality image.

Provided are non-transitory computer-readable recording media having recorded thereon a program for executing the methods on a computer.

Additional aspects will be set forth in part in the description which follows and, in part, will be apparent from the description, or may be learned by practice of the presented embodiments.

According to an aspect of an embodiment, a method of providing information regarding a virtual reality (VR) image includes: providing the VR image; determining, based on a gaze of a user viewing the VR image, an image that is reproduced in a partial area of the VR image as an image of interest; and providing information regarding the image of interest.

The information regarding the image of interest may include coordinates of an area where the image of interest is reproduced and a reproduction section of the image of interest.

The determining of the image that is reproduced in a partial area of the VR image as the image of interest may include: when the gaze of the user is fixed to a certain area of the VR image, determining the area of the VR image where the gaze of the user is fixed; and determining a VR image that is reproduced in the determined area as the image of interest.

The determining of the image that is reproduced in a partial area of the VR image as the image of interest may include: when the gaze of the user moves according to movement of an object included in the VR image, obtaining a movement path of the gaze of the user; determining areas of the VR image corresponding to the movement path of the gaze of the user; and determining a VR image that is reproduced in the determined areas as the image of interest.

The providing of the information regarding the image of interest may include: obtaining frames included in the image of interest; determining, based on an amount of change in the frames, at least one key frame from among the frames; and providing information regarding the at least one key frame.

The providing of the information regarding the image of interest may include providing the image of interest reproduced in a partial area of the VR image at a picture quality higher than that of an image reproduced in remaining areas.

The method may further include: receiving a comment of the user on the image of interest; and linking the comment of the user with the information regarding the image of interest and storing the comment of the user.

The method may further include: obtaining reproduction data of the image of interest; and transmitting the obtained reproduction data to an external device.

The method may further include: receiving, based on a result obtained by analyzing gazes of other users viewing the VR image, information regarding an image of interest of the other users; and providing the received information regarding the image of interest of the other users.

The method may further include: receiving an input of the user for selecting the provided information regarding the at least one key frame; and reproducing the VR image starting from a reproduction location of the selected information regarding the at least one key frame.

According to an aspect of another embodiment, a device for providing information regarding a virtual reality (VR) image includes: a sensor configured to sense a gaze of a user viewing the VR image; and a controller configured to provide the VR image, determine, based on the sensed gaze of the user, an image that is reproduced in a partial area of the VR image as an image of interest, and provide information regarding the image of interest.

The controller may be further configured to determine, when the gaze of the user is fixed to a certain area of the VR image, the area of the VR image where the gaze of the user is fixed, and determine a VR image that is reproduced in the determined area as the image of interest.

The controller may be further configured to obtain, when the gaze of the user moves according to movement of an object included in the VR image, a movement path of the gaze of the user, determine areas of the VR image corresponding to the movement path of the gaze of the user, and determine a VR image that is reproduced in the determined areas as the image of interest.

The controller may be further configured to obtain frames included in the image of interest, determine, based on an amount of change in the frames, at least one key frame from among the frames, and provide information regarding the at least one key frame.

The controller may be further configured to provide the image of interest reproduced in a partial area of the VR image at a picture quality higher than that of an image reproduced in remaining areas.

The device may further include a communicator configured to receive a comment of the user on the image of interest, wherein the controller may be further configured to link the comment of the user with the information regarding the image of interest and store the comment of the user.

The device may further include a communicator, wherein the controller may be further configured to obtain reproduction data of the image of interest, and the communicator may be configured to transmit the obtained reproduction data to an external device.

The device may further include a communicator configured to receive, based on a result obtained by analyzing gazes of other users viewing the VR image, information regarding an image of interest of the other users, wherein the controller may be further configured to provide the received information regarding the image of interest of the other users.

The device may further include a communicator configured to receive an input of the user for selecting the provided information regarding the at least one key frame, wherein the controller may be further configured to reproduce the VR image starting from a reproduction location of the selected key frame information.

According to an aspect of another embodiment, a non-transitory computer-readable recording medium has recorded thereon a program for executing the above method on a computer.

According to an aspect of another embodiment, a method and device includes: obtaining location information of a user; sensing a gaze of the user; determining a display area corresponding to the sensed gaze of the user as an area of interest; and providing view information displayed in the area of interest by matching the location information with the area of interest.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B are diagrams illustrating an example of a method of determining a dynamic image of interest, according to an embodiment;

FIG. 4 is a diagram illustrating an example of determining a key frame of a virtual reality image, according to an embodiment;

DETAILED DESCRIPTION

Figure 1:
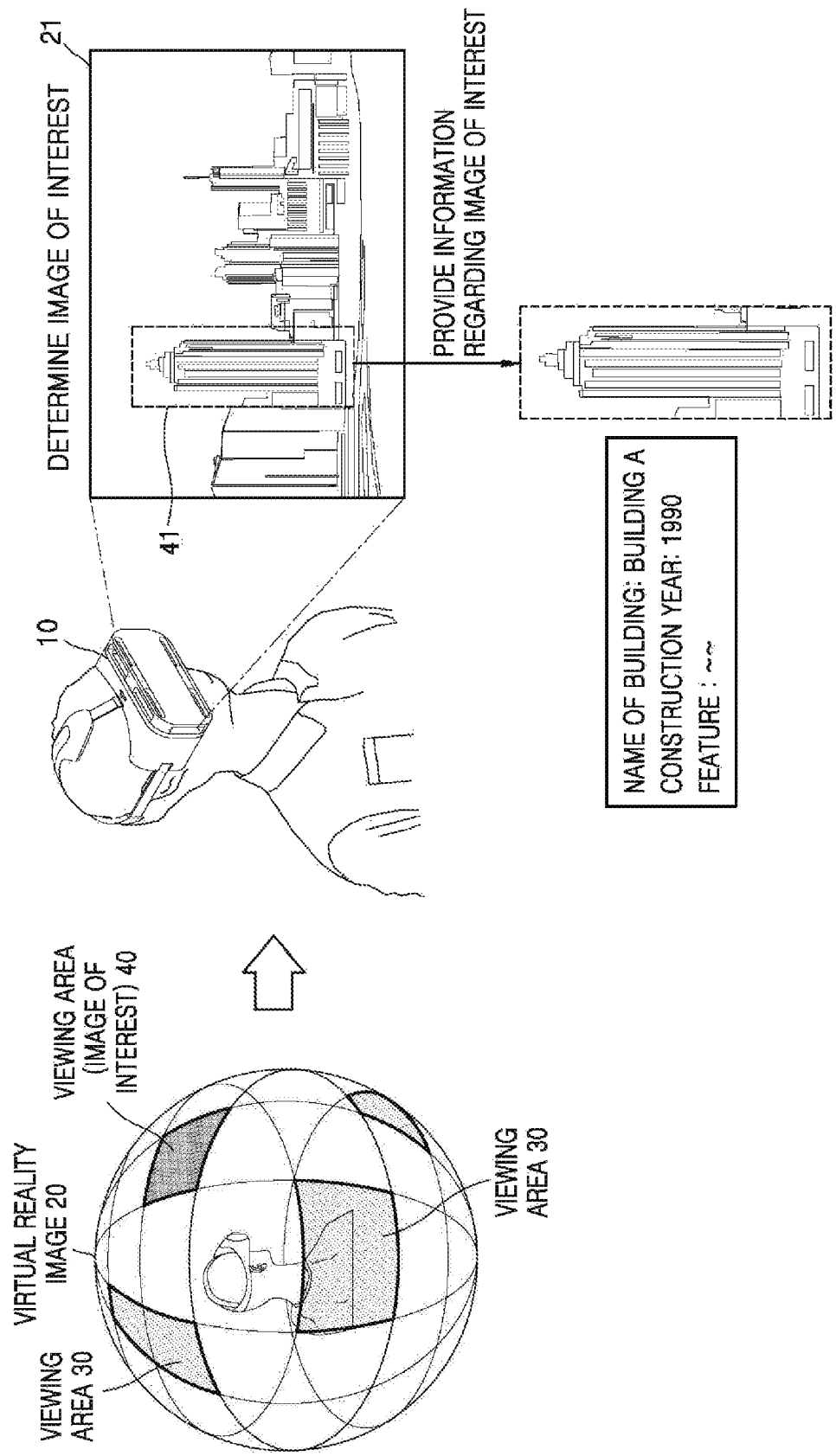
FIG. 1 illustrates a schematic diagram of a method of providing information regarding a virtual reality image, according to an embodiment.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure will now be described more fully with reference to the accompanying drawings for those of ordinary skill in the art to be able to perform the present disclosure without any difficulty. The present disclosure may, however, be embodied in many different forms and should not be construed as being limited to the embodiments set forth herein. Also, parts in the drawings unrelated to the detailed description are omitted to ensure clarity of the present disclosure, and like reference numerals in the drawings denote like elements throughout. As used herein, the term "and/or" includes any and all combinations of one or more of the associated listed items.

Expressions such as "at least one of," when preceding a list of elements, modify the entire list of elements and do not modify the individual elements of the list.

Some embodiments of the present disclosure may be described in terms of functional block components and various processing steps. Some or all of the functional blocks may be realized by any number of hardware and/or software components configured to perform specified functions. For example, functional blocks of the present disclosure may be realized by one or more microprocessors, or may be realized by circuit components for predetermined functions. In addition, for example, functional blocks of the present disclosure may be implemented with any programming or scripting language. The functional blocks may be implemented in algorithms that execute on one or more processors. Also, the present disclosure may employ any number of conventional techniques for electronics configuration, signal processing and/or data processing, etc. The terms "mechanism", "element", "means", and "component" may be used broadly, and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the accompanying drawings.

FIG. 1 illustrates a schematic diagram of a method of providing information regarding a virtual reality (VR) image, according to an embodiment.

A display apparatus 10 may provide a VR image 20 to a user. In an embodiment, the display apparatus 10 may provide a 360-degree image to the user, but a type of an image which is provided to the user is not limited thereto. For example, the user may have the display apparatus 10 fixed to his or her head and view the VR image 20 through the display apparatus 10, and the display apparatus 10 may sense a gaze of the user and determine in which area of the 360 degree image the VR image 20 that is being viewed by the user is being reproduced. In an embodiment, the display apparatus 10 may analyze the gaze of the user by using a sensor for sensing an orientation of the display apparatus 10 and a sensor for sensing a gaze direction of the user, and thus, may determine an area 30 (hereinafter referred to as a viewing area) of the VR image 20 being viewed by the user.

In an embodiment, the display apparatus 10 may distinguish areas of the VR image 20 by using polar coordinates and cartesian coordinates, and thus, may determine partial areas of the VR image 20 as the viewing area 30. For example, by sensing a gaze of the user, the display apparatus 10 may obtain coordinates of the VR image 20 corresponding to the gaze of the user, and may determine an area of the VR image 20 including the corresponding coordinates as the viewing area 30.

The display apparatus 10 may determine an image that is reproduced in some of a plurality of viewing areas 30 as an image of interest 40. In an embodiment, the display apparatus 10 may determine the image of interest 40 by using coordinates of the viewing area 30 and a reproduction section of the VR image 20 that is reproduced while a gaze of the user is located in the viewing area 30. A detailed method thereof will be described with reference to FIGS. 2 and 3.

The display apparatus 10 may provide information regarding the image of interest 40 to the user. In an embodiment, the information regarding the image of interest 40 may include, but is not limited to, coordinates of an area where the image of interest 40 is reproduced, a reproduction section of the image of interest 40, information regarding a key frame included in the image of interest 40, information regarding an object included in the key frame, and context information regarding the key frame.

For example, the display apparatus 10 may determine a VR image 21 of an area where a certain building is reproduced as an image of interest 41. The display apparatus 10 may identify that an object included in a key frame of the image of interest 41 is 'Building A', and may provide information regarding a construction year and features of the 'Building A' to the user.

In an embodiment, the display apparatus 10 may receive information regarding an image of interest of other users from an external device (not shown) or a server (not shown). Also, the display apparatus 10 may provide information regarding the image of interest determined by analyzing gazes of the other users viewing the same VR image 20 as the user to the user.

Figure 2A:
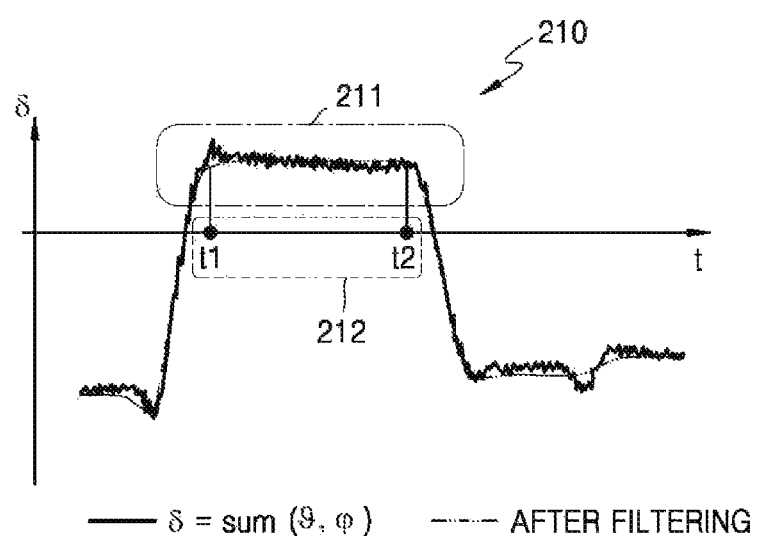
FIGS. 2A and 2B are diagrams illustrating an example of a method of determining a static image of interest, according to an embodiment.
Figure 2B:
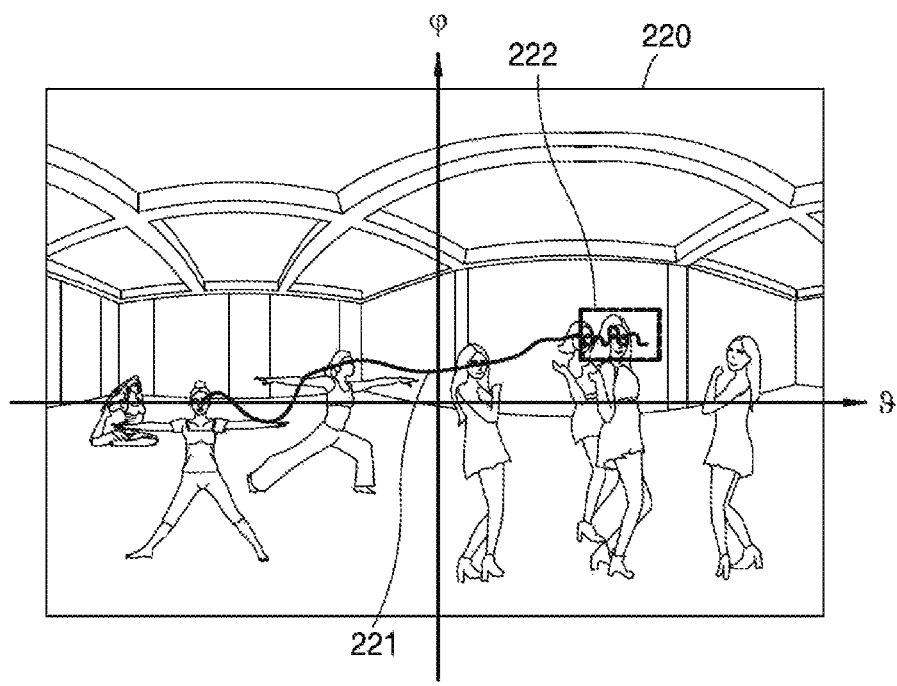

FIGS. 2A and 2B are diagrams illustrating an example of a method of determining a static image of interest, according to an embodiment.

Referring to FIGS. 2A and 2B, the display apparatus 10 may analyze a sensed gaze of a user. The display apparatus 10 may obtain coordinates of a VR image corresponding to a gaze of the user changing according to time. In an embodiment, the coordinates of the VR image may be represented by using polar coordinates. For example, the coordinates of the VR image may be represented as $P(\varphi, \theta)$, in which $\varphi(-\pi \leq \varphi \leq \pi)$ refers to an angle of a positive direction of the x-axis away from a reference direction, and $\theta(-\pi \leq \theta \leq \pi)$ refers to an angle of a positive direction of the z-axis away from the reference direction. The reference direction may be represented as $P(\varphi=0, \theta=0)$, and may be, but is not limited to, a predetermined direction in the VR image or a gaze direction of the user at a time when the user starts to view the VR image.

Referring to FIG. 2A, the display apparatus 10 may calculate an amount of movement of the gaze of the user. In an embodiment, when coordinates ($P(\varphi, \theta)$) of a VR image are represented by using polar coordinates, the display apparatus 10 may calculate an amount of movement of the gaze of the user by using a change graph 210 of a value $\sigma(\sigma=\text{sum}(\varphi, \theta))$ according to time.

The display apparatus 10 may filter the change graph 210 of the value σ according to time. For example, the display apparatus 10 may filter the change graph 210 of the value σ according to time by using a step detection algorithm. A total variation denoising algorithm, a mean shift algorithm, or a bilateral filter may be used in the step detection algorithm, but the present disclosure is not limited thereto.

In an embodiment, when a change (a slope for the graph) in the value σ according to time is less than or equal to a predetermined first critical value, the display apparatus 10 may determine that the gaze of the user is fixed to a certain area of the VR image. The fixed gaze of the user may include a state in which the gaze is still and a case in which the gaze moves in a predetermined allowable range. Also, the display apparatus 10 may determine that the gaze of the user is fixed to a certain area of the VR image by calculating a step of the change graph 210 of the value σ according to time.

The display apparatus 10 may obtain coordinates 211 of a viewing area in which a gaze of the user is located and a reproduction section 212 of the VR image that is reproduced while the gaze of the user is located in the viewing area. For example, as a result of calculating a slope for the change graph 210 of the value a according to time, when the slope for the graph during a period t1~t2 is less than or equal to the predetermined first critical value, the display apparatus 10 may obtain the coordinates 211 of the viewing area in which the gaze of the user is located during the period t1~t2 and the reproduction section t1~t2 212 of the VR image.

Referring to FIG. 2B, a moving line 221 of the gaze of the user is displayed on polar coordinates where the VR image 20 is reproduced. By using the coordinates 211 of the viewing area in which the gaze of the user is located during the period t1~t2, the display apparatus 10 may determine an area 222 from among a plurality of viewing areas, and may determine an image that is reproduced in the area 222 as a static image of interest.

Figure 3A:
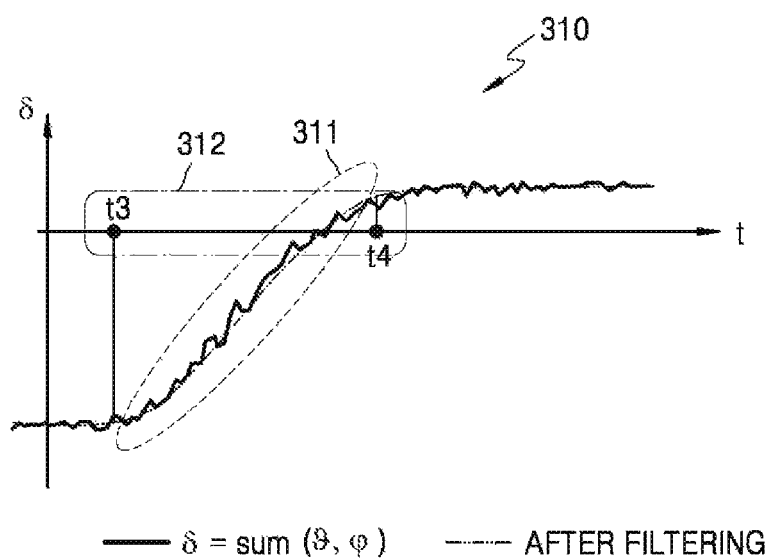

FIGS. 3A and 3B are diagrams illustrating an example of a method of determining a dynamic image of interest, according to an embodiment. A description of FIGS. 3A and 3B given with reference to FIGS. 2A and 2B is omitted below for convenience.

Referring to FIG. 3A, when a slope for a change graph 310 is greater than a predetermined first critical value and less than or equal to a second critical value (first critical value<second critical value), the display apparatus 10 may determine that a gaze of a user moves according to movement of an object included in a VR image. The display apparatus 10 may obtain coordinates 311 of a viewing area in which the gaze of the user is located and a reproduction section of the VR image that is reproduced while the gaze of the user is located in the viewing area.

For example, as a result of calculating the slope for the change graph 310 of a value σ according to time, when the slope for the graph during a period t3~t4 is greater than the predetermined first critical value and less than or equal to the second critical value, the display apparatus 10 may obtain the coordinates 311 of the viewing area in which the gaze of the user is located during the period t3~t4 and a reproduction section t3~t4 312 of the VR image that is reproduced while the gaze of the user is located in the viewing area.

Referring to FIG. 3B, the gaze of the user moves according to the movement of the object included in the VR image. The display apparatus 10 may determine areas 312a to 312d of the VR image corresponding to a movement path of the gaze of the user during the period t3~t4 312. Also, the display apparatus 10 may determine the VR image that is reproduced in the determined areas 312a to 312d as a dynamic image of interest. In an embodiment, the determined areas 312a to 312d may be different with respect to each frame included in the VR image. Also, the determined areas 312a to 312d may differ from frame to frame, and thus, each of the determined areas 312a to 312d is independent.

In an embodiment, a static image of interest may be the VR image 20 that is reproduced in the certain viewing area 30, and a dynamic image of interest may be the VR image 20 that is reproduced in not the determined viewing area 30 but the plurality of viewing areas 30 changing according to movement of the object.

In an embodiment, the display apparatus 10 may find out similarity between sections of the change graph of the value σ according to time by using convolution and cross-correlation. Also, the display apparatus 10 may determine a type of an area of interest by using a user setting method and a machine learning method in addition to a predetermined method, but a determination method is not limited thereto.

FIG. 4 is a diagram illustrating an example of determining a key frame of a VR image, according to an embodiment.

Each viewing area of a VR image may include a plurality of frames 410. In an embodiment, the display apparatus 10 may determine frames, from among the plurality of frames 410, relatively having a significant image change as key frames 420. Autocorrelation, scale-invariant feature transform (SIFT), and a speeded up robust features (SURF) algorithm may be used as a method of measuring an image change, but a measuring method is not limited thereto.

The display apparatus 10 may provide information regarding the key frames 420. In an embodiment, information 430 regarding a key frame may include, but is not limited to, a name of the VR image including the key frame, coordinates of the key frame, a reproduction location of the key frame, information regarding an object included in the key frame, and context information regarding the key frame.

Also, the display apparatus 10 may obtain emotion information of a user regarding the key frames 420. In an embodiment, the display apparatus 10 may obtain the emotion information of the user based on facial expression information and voice information of the user. For example, the display apparatus 10 may analyze emotion of the user by using the facial expression information and the voice information of the user and thus may obtain the emotion information of the user such as happiness, sadness, or anger.

Also, the display apparatus 10 may obtain information regarding an object included in the key frames 420. In an embodiment, the display apparatus 10 may detect the object included in the key frames 420. For example, the display apparatus 10 may detect the object included in the key frames 420 by using an object detection method using a local descriptor included in a representative image, an object detection method using global features, and an object detection method using color and shape features, but the present disclosure is not limited thereto.

Also, the display apparatus 10 may provide context information regarding a key frame. In an embodiment, the display apparatus 10 may provide the context information regarding the key frame by analyzing emotion information of the user and information regarding an object included in the key frame. For example, the display apparatus 10 may use a convolutional neural network (CNN) and a recurrent neural network language model (RNNLM) to provide the context information regarding the key frame.

Figure 5A:
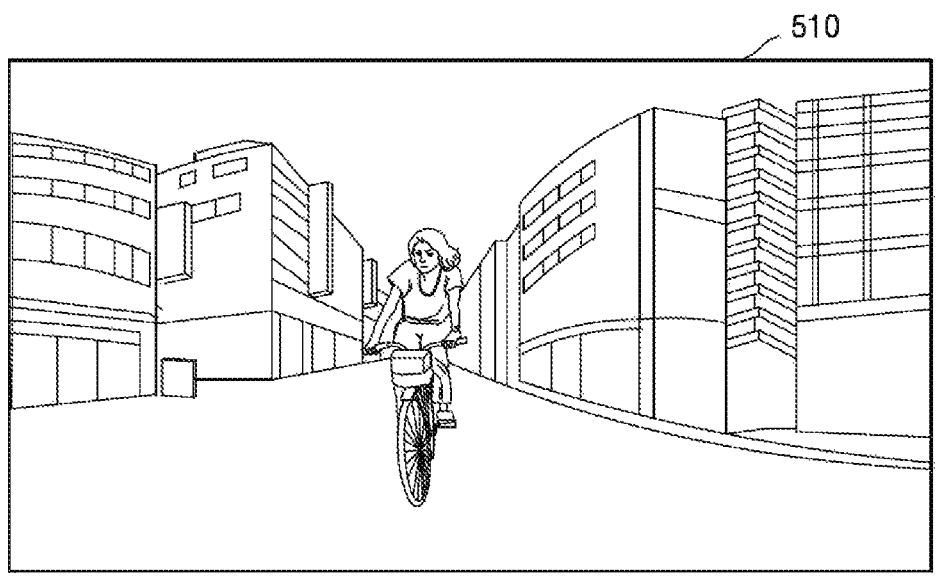
FIGS. 5A and 5B are diagrams illustrating an example of providing an image of interest to a user, according to an embodiment.
Figure 5B:
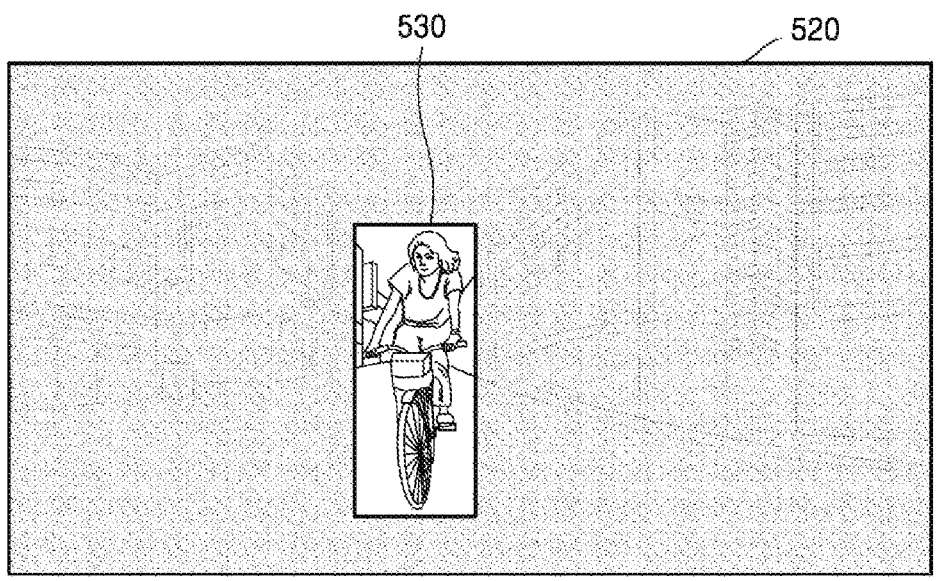

FIGS. 5A and 5B are diagrams illustrating an example of providing an image of interest to a user, according to an embodiment.

Referring to FIG. 5A, a VR image 510 is provided to a user. Every area included in the VR image 510 may be provided to the user at the same picture quality.

Referring to FIG. 5B, the display apparatus 10 may provide a VR image of an area 530 where an image of interest is reproduced at a picture quality higher than that of a VR image 520 that is reproduced in remaining areas. In an embodiment, at the time of loading a stored VR image or streaming a real-time image, the display apparatus 10 may provide the VR image of the area 530 where the image of interest is reproduced at a picture quality higher than that of the VR image 520 that is reproduced in remaining areas.

Figure 6:
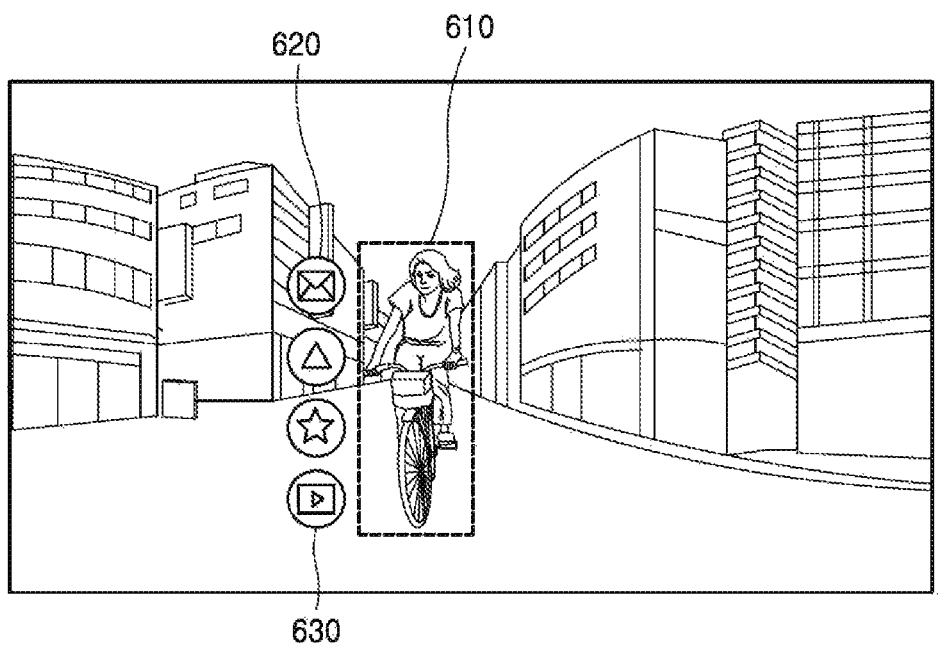
FIG. 6 is a diagram illustrating an example of displaying a comment of a user on an image of interest, according to an embodiment.

FIG. 6 is a diagram illustrating an example of displaying a comment of a user on an image of interest, according to an embodiment.

Referring to FIG. 6, the display apparatus 10 may receive a comment of a user on an image of interest 610. In an embodiment, the display apparatus 10 may receive a message of the user regarding the image of interest 610, emotion information of the user, and preference information of the user, but the comment of the user which may be received by the display apparatus 10 is not limited thereto. For example, the user may select an icon 620 and write a message regarding the image of interest 610.

Also, the display apparatus 10 may link the received comment of the user with information regarding the image of interest and store the comment in the display apparatus 10 or a server (not shown).

The display apparatus 10 may obtain reproduction data of the image of interest 610. In an embodiment, the display apparatus 10 may receive an input of the user and obtain data of the image of interest. For example, when the user selects an icon 630, the display apparatus 10 may obtain reproduction data of the image of interest 610. The reproduction data of the image of interest 610 may include, but is not limited to, image information and audio information included in the image of interest 610 and comment information of the user regarding the image of interest 610.

In an embodiment, the display apparatus 10 may transmit the obtained reproduction data of the image of interest 610 to an external device (not shown) and a server (not shown).

Figure 7:
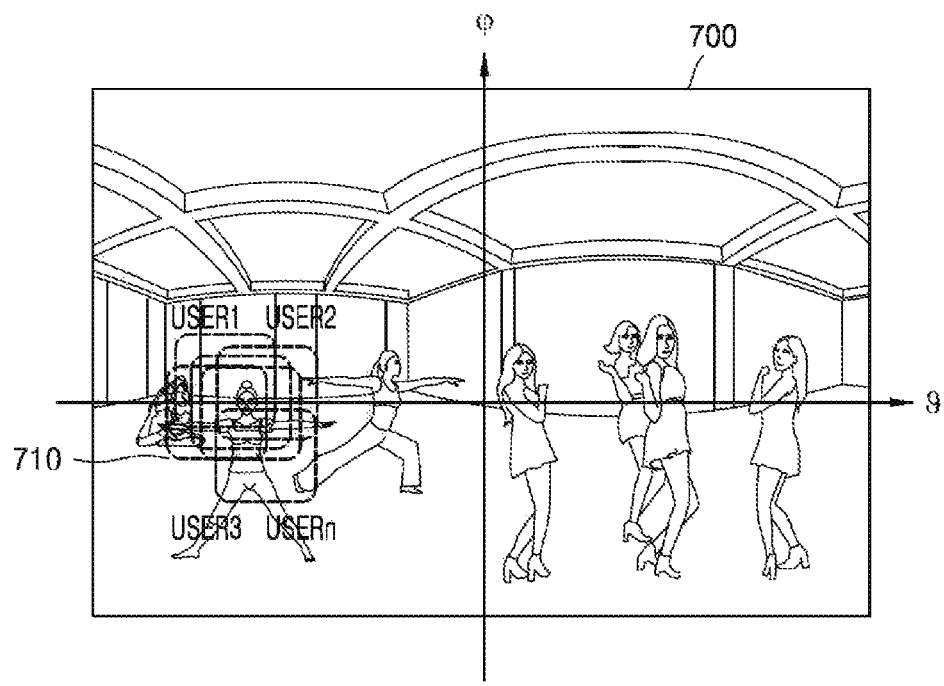
FIG. 7 is a diagram illustrating an example of providing information regarding an image of interest received from the outside, according to an embodiment.

FIG. 7 is a diagram illustrating an example of providing information regarding an image of interest received from the outside, according to an embodiment.

Referring to FIG. 7, the display apparatus 10 may receive information regarding an image of interest from an external device (not shown) or a server (not shown). In an embodiment, the received information regarding the image of interest may be information obtained by analyzing gazes of other users viewing a VR image that is the same as that viewed by a user.

The display apparatus 10 may provide the received information regarding the image of interest of the other users to the user. In an embodiment, the display apparatus 10 may display the information regarding the image of interest of the other users on corresponding coordinates 710 in a VR image 700 by using coordinates of an area where the image of interest is reproduced, which are included in the information regarding the image of interest of the other users. Also, when information obtained from other n users is received, the received information may be classified from user to user and be displayed on the corresponding coordinates 710 in the VR image 700.

In an embodiment, the received information regarding the image of interest may include coordinates of an area where the image of interest is reproduced, a reproduction section of the image of interest, information regarding a key frame included in the image of interest, information regarding an object included in the key frame, and context information regarding the key frame. Also, the received information regarding the image of interest may include, but is not limited to, a message regarding the image of interest input by the other users and obtained emotion information of the other users.

Figure 8:
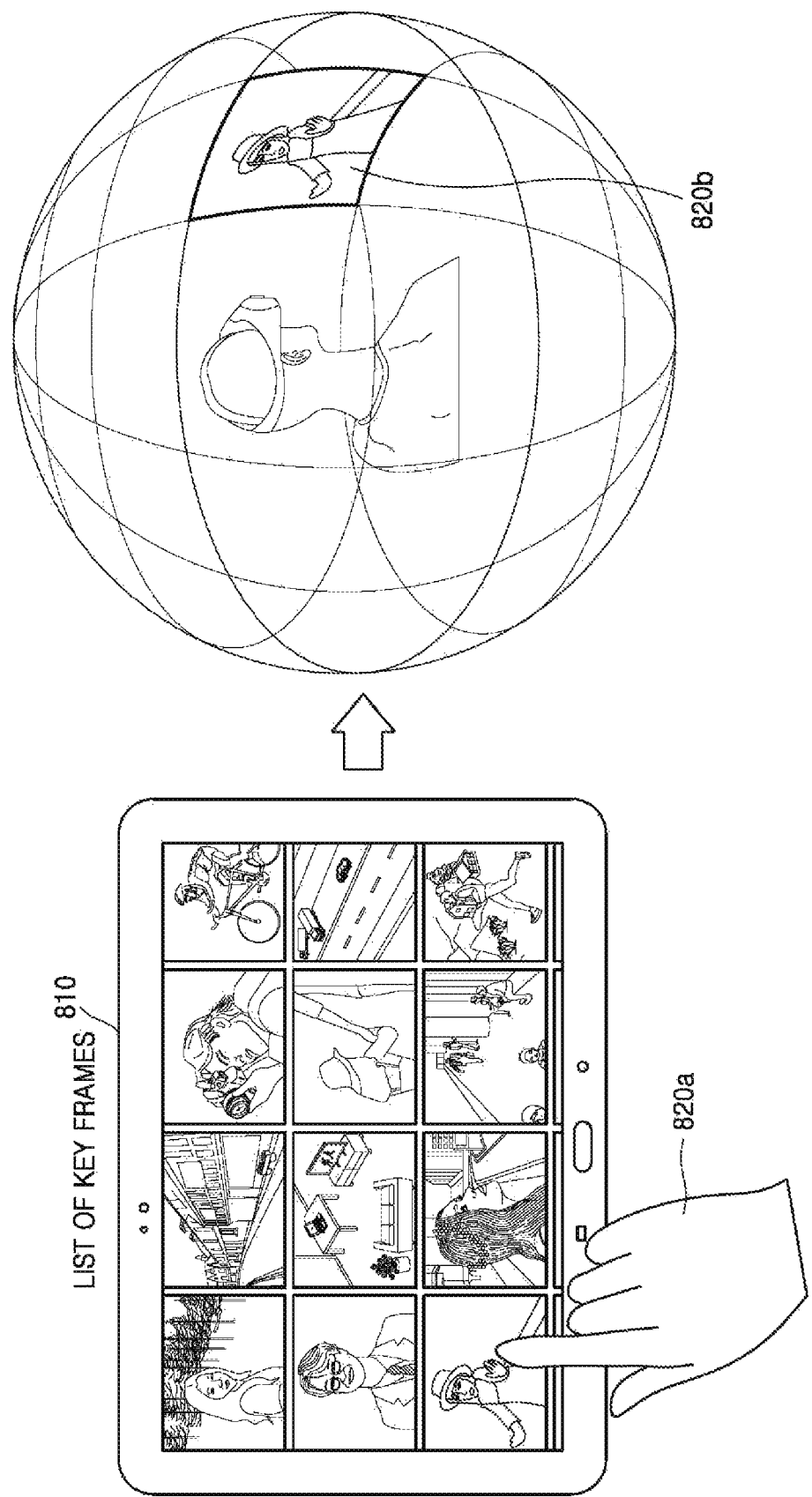
FIG. 8 is a diagram illustrating an example of providing information regarding an image of interest selected by a user, according to an embodiment.

FIG. 8 is a diagram illustrating an example of providing information regarding an image of interest selected by a user, according to an embodiment.

Referring to FIG. 8, a user input for selecting information regarding an image of interest may be received. In an embodiment, the display apparatus 10 may display a list 810 of a plurality of key frames included in the image of interest. A user may select a key frame 820a from among the displayed list 810 of the plurality of key frames. The display apparatus 10 may provide information regarding the key frame 820a selected by the user. For example, the display apparatus 10 may provide coordinates of the key frame 820a selected by the user and a reproduction location of the key frame 820a. Also, by using the provided information, the display apparatus 10 may reproduce a VR image so that the user may view the VR image starting from a reproduction location of a selected key frame 820b.

Figure 9:
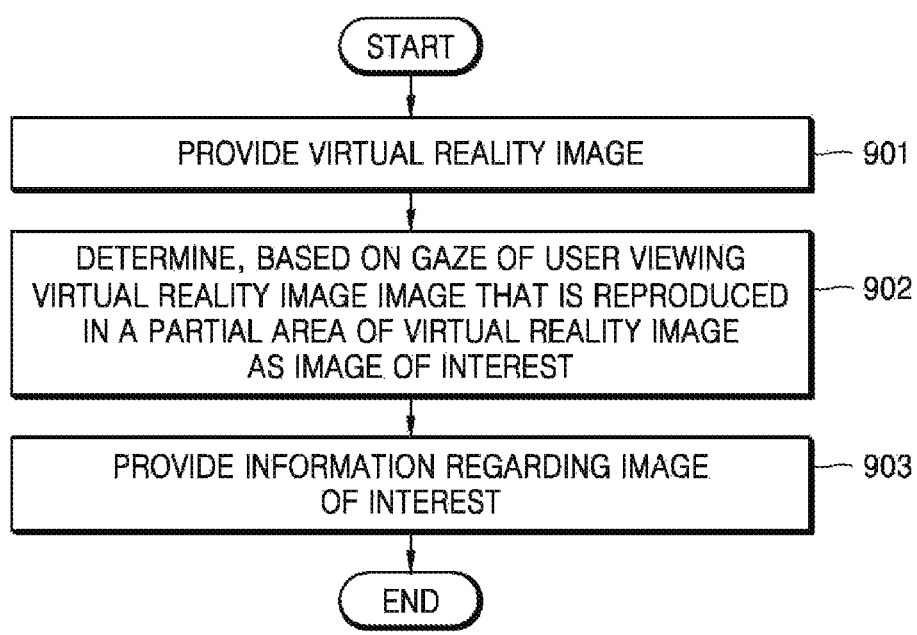
FIG. 9 illustrates a flowchart of a method of providing information regarding a virtual reality image, according to an embodiment.

FIG. 9 illustrates a flowchart of a method of providing information regarding a VR image, according to an embodiment.

Referring to FIG. 9, in operation 901, the display apparatus 10 may provide a VR image to a user. The display apparatus 10 may provide a 360-degree image to the user.

In operation 902, the display apparatus 10 may determine, based on a gaze of the user viewing the VR image, an image that is reproduced in a partial area of the VR image as an image of interest. By sensing the gaze of the user, the display apparatus 10 may determine in which area of the 360 degree image the VR image that is being viewed by the user is being reproduced, that is, a viewing area of the user. The display apparatus 10 may determine the image of interest by using coordinates of the viewing area 30 and a reproduction section of the VR image that is reproduced while the gaze of the user is located in the viewing area 30.

In operation 903, the display apparatus 10 may provide information regarding the image of interest to the user. The information regarding the image of interest may include coordinates of an area in which the image of interest is reproduced, a reproduction section of the image of interest, information regarding a key frame included in the image of interest, information regarding an object included in the key frame, and context information regarding the key frame.

Figure 10:
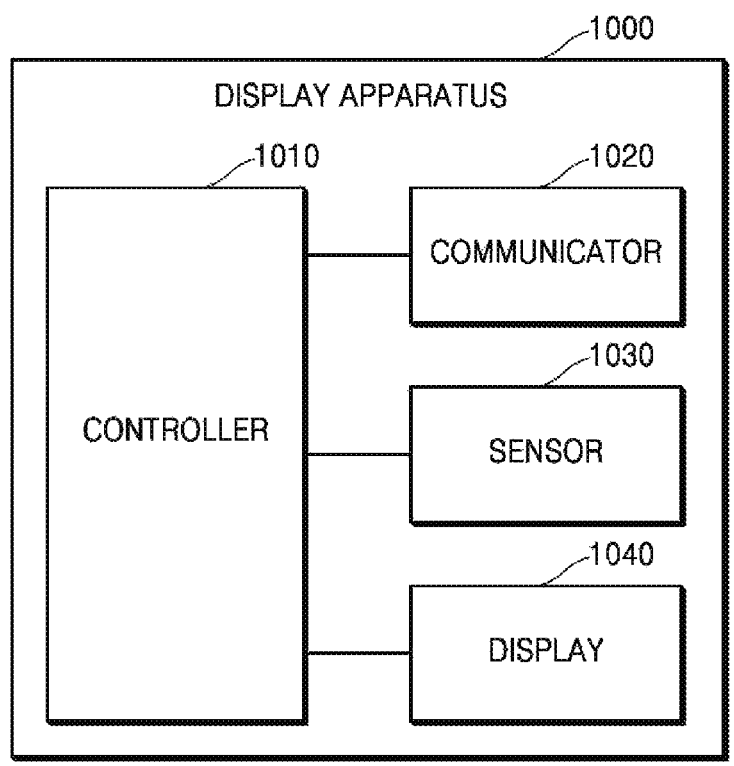
FIG. 10 illustrates a block diagram of an apparatus for providing information regarding a virtual reality image, according to an embodiment.

FIG. 10 illustrates a block diagram of an apparatus for providing information regarding a VR image, according to an embodiment.

Referring to FIG. 10, a display apparatus 1000 may include a controller 1010, a communicator 1020, a sensor 1030, and a display 1040. FIG. 10 shows the display apparatus 1000 including elements related to the present embodiment. Accordingly, it will be understood by those of ordinary skill in the art that the display apparatus 1000 may further include other general-purpose elements in addition to the elements shown in FIG. 10.

The display apparatus 1000 may be, but is not limited to, a head mounted display, a VR headset, a VR device, a personal computer (PC), a laptop computer, a smart television (TV), a cellular phone, a personal digital assistant (PDA), a smart terminal, a game device, or the like capable of providing a VR image. Also, the display apparatus 1000 may be glasses, a hair band, a watch, or the like with a communication function and a data processing function.

The controller 1010 may provide a VR image to a user of the display apparatus 1000. Also, the controller 1010 may determine, based on a gaze of the user viewing the VR image, an image that is reproduced in an area of the VR image as an image of interest. Also, the controller 1010 may provide information regarding the image of interest the user.

The communicator 1020 may include one or more elements that allow the display apparatus 1000 and an external device (not shown) or a server (not shown) to communicate with each other. In an embodiment, the communicator 1020 may obtain information regarding an image of interest from the external device (not shown) or the server (not shown). The information regarding the image of interest received in the communicator 1020 may be information obtained by analyzing gazes of other users viewing a VR image that is the same as the VR image that the user views. The communicator 1020 may receive a comment of the user on the image of interest.

The sensor 1030 may sense a state of the display apparatus 1000 or a state of the user of the display apparatus 1000 and may transmit sensed information to the controller 1010. The sensor 1030 may include, but is not limited to, at least one of a magnetic sensor, an acceleration sensor, an infrared sensor, a gyroscope sensor, a position sensor (for example, global positioning system (GPS)), a proximity sensor, an orientation sensor, a gaze direction sensor, and a RGB sensor (Red Green Blue illuminance sensor). The function of each sensor may be intuitively inferred from its name by those of ordinary skill in the art, and thus, a detailed description thereof is omitted.

The sensor 1030 may sense a gaze of the user by using an orientation sensor and a gaze direction sensor. Also, the sensor 1030 may be combined with a camera to sense facial expression of the user. Also, the sensor 1030 may be combined with a microphone and a tension sensor to sense voice of the user.

The display 1040 may display information that is processed in the display apparatus 1000. In an embodiment, the display 1040 may display information regarding an image of interest determined in the controller 1010. Also, the display 1040 may display the information regarding the image of interest on a viewing area of the VR image. Also, the display 1040 may display information regarding a plurality of images of interest received from the communicator 1020.

Functions and roles of the sensor 1030 and the display 1040 may be performed by a separate external device (not shown). For example, the function and role of the sensor 1030 may be performed by a camera (not shown) outside the display apparatus 1000, and the function and role of the display 1040 may be performed by a screen outside the display apparatus 1000.

Figure 11A:
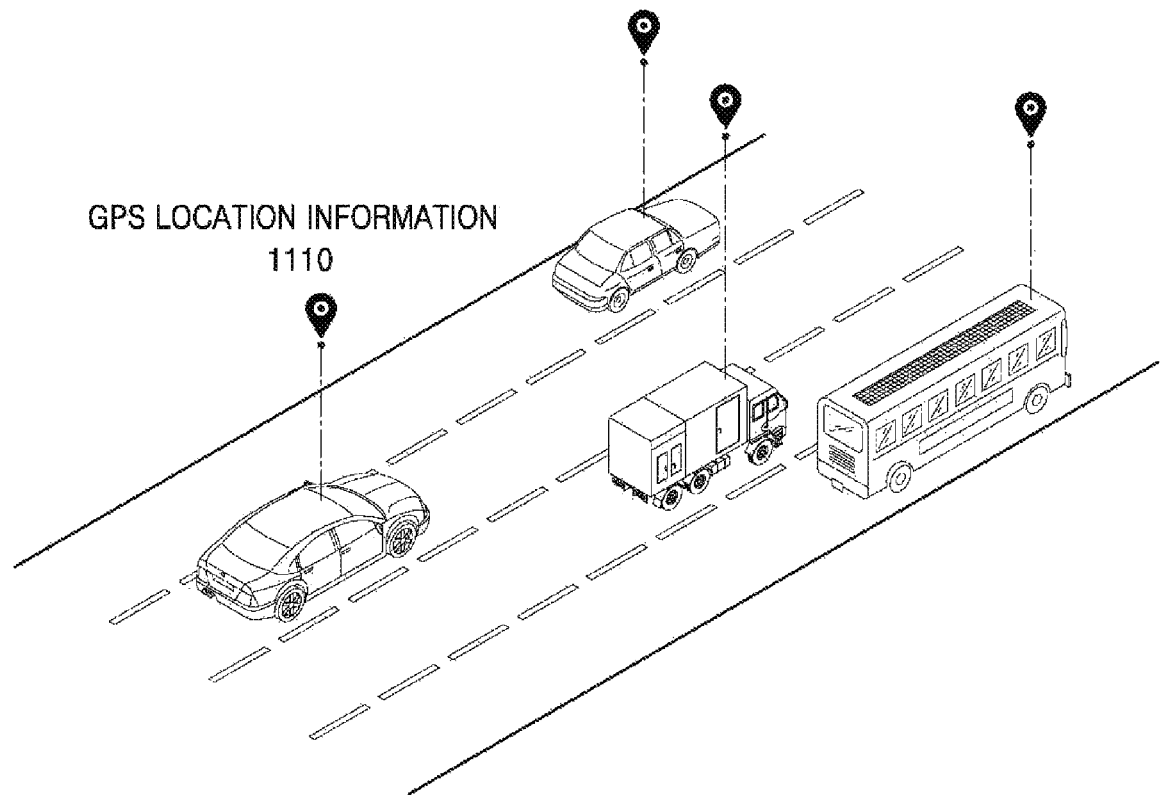
FIGS. 11A and 11B are diagrams illustrating an example of providing information regarding an area of interest to a user by using the global positioning system (GPS), according to an embodiment.
Figure 11B:
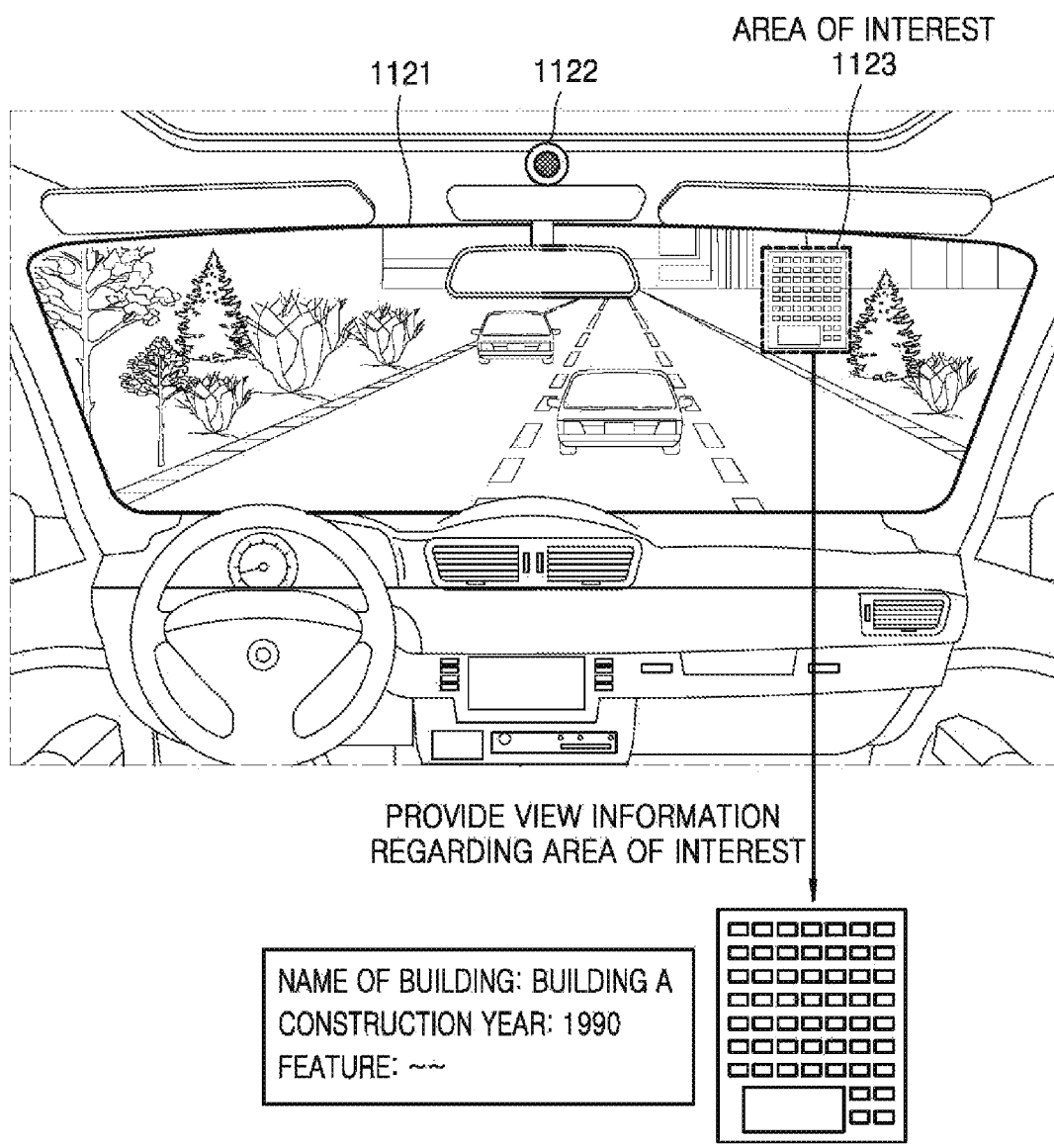

FIGS. 11A and 11B are diagrams illustrating an example of providing information regarding an area of interest to a user by using the GPS, according to an embodiment. A description of FIGS. 11A and 11B given with reference to FIGS. 1 to 10 is omitted below for convenience.

In an embodiment, a display apparatus 1121 may include a screen capable of providing information regarding an area of interest and may operate in combination with a camera 1122.

The display apparatus 1121 may obtain location information of a user. Also, by sensing a gaze of the user, the display apparatus 1121 may determine a display area corresponding to the gaze of the user as the area of interest. Also, by matching the location information and the area of interest, the display apparatus 1121 may provide view information displayed on the area of interest.

Referring to FIG. 11A, the display apparatus 1121 may obtain location information 1110 of the user by using the GPS. For example, the display apparatus 1121 may obtain the location information 1110 of the user in a vehicle by using the GPS. In an embodiment, the display apparatus 1121 may obtain the location information 1110 of the user from an external device (not shown) or a server (not shown).

Referring to FIG. 11B, the display apparatus 1121 may sense a gaze of the user by using the camera 1122 and thus may determine in which area on the display apparatus 1121 the gaze of the user is located and a moving line along which the gaze of the user moves.

In an embodiment, when the gaze of the user is determined as being located in a certain area of the display apparatus 1121 for a period of time, the display apparatus 1121 may determine the certain area as an area of interest 1123. The display apparatus 1121 may provide view information displayed on the area of interest 1123 to the user by analyzing location information and the area of interest 1123 of the user. In an embodiment, the view information may be displayed around the area of interest 1123.

For example, by analyzing user location information and the area of interest 1123, the display apparatus 1121 may determine that an object included in the area of interest 1123 is 'Building A'. The display apparatus 1121 may provide a construction year and features of the 'Building A' to the user as the view information.

Also, in an embodiment, in order to prevent concentration of the user driving a car from being distracted, the display apparatus 1121 may block a certain area where received view information is displayed.

In an embodiment, the display apparatus 1121 may provide view information received from the external device (not shown) or the server (not shown) to the user. The display apparatus 1121 may display the received view information on a certain area of the display apparatus 1121 by using location information of the user.

The display apparatus 1121 may provide view information regarding the area of interest to the user via a screen, a and a smartphone, but the present disclosure is not limited thereto.

One or more embodiments of the present disclosure may be embodied as a recording medium including a command which is executable by a computer, such as a program module which is executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable medial, which have been implemented by an arbitrary method or technology, for storing information such as computer-readable commands, data structures, program modules, or other data. The communication medium typically includes a computer-readable command, a data structure, a program module, other data of a modulated data signal, or another transmission mechanism, and an example thereof includes an arbitrary information transmission medium.

The term "-er" or "-or" used herein may be a hardware component, such as a processor or a circuit, and/or a software component which is executed by a hardware component, such as a processor.

While one or more embodiments have been described with reference to the figures, it will be understood by those of ordinary skill in the art that various changes in form and details may be made therein without departing from the spirit and scope as defined by the following claims. It should be understood that embodiments described herein should be considered in a descriptive sense only and not for purposes of limitation. For example, each component described as a single type may be executed in a distributed manner, and components described as being distributed may also be executed in an integrated form.

The scope of the present disclosure is indicated by the appended claims rather than by the detailed description, and it should be understood that the claims and all changes or modifications drawn from the concept of the claims are included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing information regarding a virtual reality (VR) image, the method comprising:
   providing the VR image;
   obtaining a summation value of polar coordinates of the VR image corresponding to a gaze of a user viewing the VR image;
   calculating a change amount over time of the summation value of the polar coordinates;
   determining an image corresponding to an area of the VR image in which the gaze of the user is located during a time when the change amount is less than or equal to a first threshold value as a static image of interest;
   determining at least one image corresponding to at least one area of the VR image in which the gaze of the user is located during a time when the change amount is between the first threshold value and a second threshold value as a dynamic image of interest; and
   providing information regarding at least one at least one of the static image of interest and the dynamic image of interest.

2. The method of claim 1, wherein the information regarding at least one of the static image of interest and the dynamic image of interest comprises coordinates of an area where the at least one static image of interest and the dynamic image of interest is reproduced and a reproduction section of the at least one static image of interest and the dynamic image of interest.

3. The method of claim 1, wherein the providing the information regarding at least one of the static image of interest and the dynamic image of interest comprises:
   obtaining frames comprised in at least one of the static image of interest and the dynamic image of interest;
   determining, based on an amount of change in the frames, at least one key frame from among the frames; and
   providing information regarding the at least one key frame.

4. The method of claim 3, further comprising:
   receiving an input of the user for selecting the provided information regarding the at least one key frame; and
   reproducing the VR image starting from a reproduction location of the selected information regarding the at least one key frame.

5. The method of claim 1, wherein the providing the information regarding at least one of the static image of interest and the dynamic image of interest comprises:
   providing at least one of the static image of interest and the dynamic image of interest reproduced in a partial area of the VR image at a picture quality higher than that of an image reproduced in remaining areas.

6. The method of claim 1, further comprising:
   receiving a comment of the user on at least one of the static image of interest and the dynamic image of interest; and
   linking the comment of the user with the information regarding at least one of the static image of interest and the dynamic image of interest and storing the comment of the user.

7. The method of claim 1, further comprising:
   obtaining reproduction data of at least one of the static image of interest and the dynamic image of interest; and
   transmitting the obtained reproduction data to an external device.

8. The method of claim 1, further comprising:
   receiving, based on a result obtained by analyzing gazes of other users viewing the VR image, information regarding an image of interest of the other users; and
   providing the received information regarding the image of interest of the other users.

9. A device for providing information regarding a virtual reality (VR) image, the device comprising:
   a sensor configured to sense a gaze of a user viewing the VR image; and
   a controller coupled to the sensor, the controller configured to:
     provide the VR image,
     obtain a summation value of polar coordinates of the VR image corresponding to the sensed gaze of the user,
     calculate a change amount over time of the summation value of the polar coordinates,
     determine an image corresponding to an area of the VR image in which the gaze of the user is located during a time when the change amount is less than or equal to a first threshold value as a static image of interest,
     determine at least one image corresponding to at least one area of the VR image in which the gaze of the user is located during a time when the change amount is between the first threshold value and a second threshold value as a dynamic image of interest, and
     provide information regarding at least one of the static image of interest and the dynamic image of interest.

10. The device of claim 9, wherein the controller is further configured to:
    obtain frames comprised in the at least one of the static image of interest and the dynamic image of interest;
    determine, based on an amount of change in the frames, at least one key frame from among the frames; and
    provide information regarding the at least one key frame.

11. The device of claim 10, further comprising a communicator, wherein the communicator is configured to:
    receive an input of the user for selecting the provided information regarding the at least one key frame,
    wherein the controller is further configured to reproduce the VR image starting from a reproduction location of the selected information regarding the at least one key frame.

12. The device of claim 9, wherein the controller is further configured to:
    provide the at least one of the static image of interest and the dynamic image of interest reproduced in a partial area of the VR image at a picture quality higher than that of an image reproduced in remaining areas.

13. The device of claim 9, further comprising a communicator, wherein the communicator is configured to:
    receive a comment of the user on the at least one of the static image of interest and the dynamic image of interest,
    wherein the controller is further configured to link the comment of the user with the information regarding the at least one of the static image of interest and the dynamic image of interest and store the comment of the user.

14. The device of claim 9, further comprising a communicator, and
    wherein the controller is further configured to obtain reproduction data of the at least one of the static image of interest and the dynamic image of interest, and the communicator is configured to transmit the obtained reproduction data to an external device.

15. The device of claim 9, further comprising a communicator, wherein the communicator is configured to:
receive, based on a result obtained by analyzing gazes of other users viewing the VR image, information regarding an image of interest of the other users,
wherein the controller is further configured to provide the received information regarding the image of interest of the other users.

16. A non-transitory computer-readable recording medium embodying a computer program, the computer program comprising computer readable program code that, when executed by at least one processor, causes the at least one processor to:
provide a VR image;
obtain a summation value of polar coordinates of the VR image corresponding to a gaze of a user viewing the VR image;
calculate a change amount over time of the summation value representing the polar coordinates,
determine an image corresponding to an area of the VR image in which the gaze of the user is located during a time when the change amount is less than or equal to a first threshold value as a static image of interest;
determine at least one image corresponding to at least one area of the VR image in which the gaze of the user is located during a time when the change amount is between the first threshold value and a second threshold value as a dynamic image of interest; and
provide information regarding the image of interest.

* * * * *